United States Patent [19]

Shaffer

[11] Patent Number: 5,120,683

[45] Date of Patent: Jun. 9, 1992

[54] MULLITE/YTTRIA STABILIZED ZIRCONIA/BORON NITRIDE COMPOSITES

[75] Inventor: Gregory W. Shaffer, Brunswick, Ohio

[73] Assignee: Union Carbide Coatings Service Technology Corporation, Danbury, Conn.

[21] Appl. No.: 693,546

[22] Filed: Apr. 30, 1991

[51] Int. Cl.$^5$ ............... C04B 35/48; C04B 35/58
[52] U.S. Cl. ................... 501/96; 501/105; 501/128
[58] Field of Search ............ 501/96, 105, 128, 98

[56] References Cited

U.S. PATENT DOCUMENTS

| | | | |
|---|---|---|---|
| 4,007,049 | 2/1977 | Rossi et al. | 106/58 |
| 4,495,123 | 1/1985 | Hunold et al. | 264/69 |
| 4,598,053 | 7/1986 | Yamakawa et al. | 501/103 X |
| 4,626,517 | 12/1986 | Watanabe et al. | 501/103 X |
| 4,640,902 | 2/1987 | Lange | 501/103 X |
| 4,742,030 | 5/1988 | Masaki et al. | 501/103 X |
| 4,748,138 | 5/1988 | Watanabe et al. | 501/103 X |
| 4,789,651 | 12/1988 | Sugie et al. | 501/103 |
| 4,904,626 | 2/1990 | Shaffer | 501/98 |
| 4,997,605 | 3/1991 | Shaffer | 264/65 |

FOREIGN PATENT DOCUMENTS 784704 10/1957 United Kingdom.

OTHER PUBLICATIONS

"Charge for the Production of a Composite Material", Karpinos, D. M. et al Institute of Problems in Material Management, Academy of Sciences, Ukainian SSR USSR 527,406 Cl C04B35/58, Sep. 5, 1976 Appln. 2,136,747, May 23, 1975 from Otkrytiya, Izobret. Prom. Obraztsy Tovarnye Znaki 1976, 53(36), 50 Abstract only.

"Charge for Preparing Refractory Material", Gaivoa, T. I. et al institute of Problems of Material Management, Academy of Sciences Ukainian SSR USSR 268,971 C1 C04b, Apr. 10, 1970, Appl. Jul. 22, 1968, From Otkrytiya, Izobret., Prom. Obraztsy, Tovarnye Znaki 1970, 47 (14) 152 Abstract only.

"Shock Resistance Ceramics", V. M. Grosheva et al Inst. Probl. Materialoved., Kiev., USSR Stekio Keram. 1970, 27 (11), 36–7 English abstract only.

"Thermally Bonded Firbour Product", C. A. Hill et al (Babcock and Wilcox Co.) U.S. US 4,650,775 (Cl. 501-95; Co4B35/02) Mar. 17, 1980 Appln. 857,699, Apr. 29, 1986; 3 pp. Abstract only.

"Refractory Composite", Karpinos, D. M. et al Institute of Problems in Material Management Academy of Sciences, Ukrainian SSR USSR 530,018 Cl. C04B35/58, Sep. 30, 1976, Appl. 2, 116,845 Mar. 25, 1975 from Otkrytiya, Izobret., Prom. Tovarnye Znaki 1976 53(36), 50 Abstract only.

Microstructure and thermomechanical properties in alumina-and mullite-boron-nitride particulate ceramic-ceramic composites, by D Lewis, et al Ceram. Eng. Sci. Proc., 2:719–727 (Nos. 7–8, 1981).

Effect of Boron Nitride Addition on Like Properties of Aluminosil Refractories, S. G. Tresvyatskii et al, Institute for Materials Science Research, Academy of Sciences of the Ukrainian SSR. Translated from Ogneuporty, No. 4, pp. 36–39, Apr., 1968.

Development and metallurgical analysis of the horizontal continuous casting. Yoshio Miyashita, et al I&SM, Aug., 1981, pp. 22–28.

*Primary Examiner*—Karl Group
*Attorney, Agent, or Firm*—Cornelius F. O'Brien

[57] ABSTRACT

A hot-pressed ceramic composite of mullite/yttria stabilized zirconia/boron nitride having good resistance to thermal shock and good erosion/corrosion resistance to molten alloys, and a method for producing said composite which comprises the blending of fused mullite with boron nitride.

6 Claims, 2 Drawing Sheets

MULLITE/YTTRIA STABILIZED ZIRCONIA/BORON NITRIDE COMPOSITES

FIELD OF THE INVENTION

The invention relates to ceramic composites and a method of making ceramic composites having good erosion and corrosion resistance to molten metals and alloys, and good resistance to thermal shock which comprises the blending of mullite and yttria stabilized zirconia with boron nitride and then hot pressing the blend.

BACKGROUND OF THE INVENTION

Ceramic materials are currently being used successfully in a variety of applications, such as for break rings in horizontal continuous casting processes. The horizontal continuous casting process involves extreme environmental conditions such as rapid rises in temperature, and severe temperature gradients. Generally, break rings for use in this type of application would be subjected to extremely fast temperature rises, and high temperature gradients often in excess of 1000° C./cm. These conditions require a material that has good thermal shock resistance to prevent breaking. Additionally, in this type of application, the material should preferably have a high abrasive resistance and corrosion resistance with respect to molten metals, be machinable, and be economical to manufacture.

Boron nitride (BN) is presently being successfully used as a material for break rings due to its good thermal shock resistance, corrosion resistance, stability at high temperature, and machinability. However, it lacks good abrasion resistance, which renders it subject to high wear rates when exposed to flowing metal. Additionally, boron nitride ceramics typically contain a $B_2O_3$ binder phase that can react chemically with molten metals, which further degrades the integrity of the boron nitride ceramic. The degradation of the boron nitride can also cause problems with the metal being cast. Boron nitride particles, as well as bubbles which form from gaseous $B_2O_3$ or $CO_2$ from the reaction of $B_2O_3$ with carbon, can be trapped in the metal as it solidifies.

Alumina ($Al_2O_3$) is also used in molten metal applications due to its hardness, abrasion resistance, and chemical stability. Although satisfactory, alumina ceramics often have poor thermal shock properties, and are difficult to machine because of their hardness. Thus ceramic components have been made with boron nitride and alumina in which the material has the abrasion resistance and chemical stability of the alumina and has the thermal shock resistance and good machinability of the boron nitride.

U.S. Pat. No. 4,007,049 discloses a thermal shock resistant material that has a high degree of resistance to failure by thermal fracture and which comprises a composite of a refractory oxide and flaked boron nitride. The boron nitride flakes are incorporated into a refractory oxide matrix as an inert, nonreactive, uniform dispersed phase in proportions sufficient to provide the oxide composite with an increased resistance to thermal shock.

British Patent No. 784,704 discloses articles comprising boron nitride and refractory oxide, such as mullite in which the preferred compositions contain only up to 30 percent by weight boron nitride.

S. G. Tresvyatskii et al in "Effect of Boron Nitride Addition on Some Properties of Aluminosilicate Refractories", Institute for Materials Science Research, Academy of Sciences of the Ukrainian SSR, No. 4, pp. 36-39, Apr., 1968 discloses that the thermal shock resistance of aluminosilicate refractories can be increased with an addition of boron nitride.

Lewis et al in "Microstructure and Thermomechanical Properties in Alumina- and Mullite-Boron-Nitride Particulate Ceramic-Ceramic Composites", Ceram. Eng. Sci. Proc., 2:719-727 (Nos. 7-8, 1981) discloses the preparation of $Al_2O_3$-BN and mullite-BN composites and provides data on the thermal shock resistance of such composites.

U.S. Pat. No. 4,904,623 discloses a ceramic composite composed of a fused zirconia mullite with boron nitride that is recited as having good erosion and corrosion resistance to molten metals and good resistance to thermal shock. However, these composites have been found to expand up to 1100° C. and then go through a shrinkage phase transformation of the zirconia mullite. In some applications, this phenomenon would lead to cracking due to the stress imparted to the composite during heating.

It is an object of the present invention to effectively correct for shrinkage at high temperatures by providing a ceramic material that has good erosion/corrosion resistance in high temperature environments.

Another object of the present invention is to provide a ceramic composite that is suitable for use as a break ring in a horizontal continuous casting process.

The above and further objects and advantages of this invention will become apparent upon consideration of the following detailed description thereof.

SUMMARY OF INVENTION

The invention relates to a hot-pressed ceramic composite having good erosion/corrosion resistance in high temperature environments, good resistance to thermal shock, an essentially linear coefficient of thermal expansion, and which comprises a blend of boron nitride yttria stabilized zirconia and mullite, said ceramic composition comprising from 10 to 60 weight percent mullite, from 10 to 30 weight percent yttria stabilized zirconia and from 30 to 70 weight percent boron nitride based on the weight of the ceramic composite.

Mullite ($3Al_2O_3 \cdot 2SiO_2$) is an orthorhombic homogeneous solid solution of alumina in sillimanite and can be made by heating andalusite, sillimanite or kyanite. The solidified mass can be crushed to produce a particulate form of the mullite.

Yttria stabilized zirconia suitable for use in this invention can be obtained from Muscle Shoals Minerals Company under the brand name ZY-7 Fines. This material contains about 90 to 95% stabilized zirconia and 5 to 10% yttria with minor amounts of less than 0.5% of other compounds such as $SiO_2$, $TiO_2$, $MgO_2$, $Al_2O_3$ and $Fe_2O_3$.

In accordance with this invention, the amount of mullite, yttria stabilized zirconia and boron nitride in the ceramic composite can be from 10 to 60 weight percent mullite, from 10 to 30 weight percent yttria stabilized zirconia and from 30 to 70 weight percent boron nitride, preferably from 20 to 40 weight percent mullite, from 15 to 25 weight percent yttria stabilized zirconia and from 40 to 60 weight percent boron nitride, and more preferably about 32 weight percent mullite, 18 weight percent ytrria stabilized zirconia and 50 weight percent boron nitride.

Another aspect of the invention is a method for producing a hot pressed ceramic composite which comprises:

a) blending a mixture comprising from 10 to 60 weight percent particulate mullite, from 10 to 30 weight percent particulate yttria stabilized zirconia and 30 to 60 weight percent particulate boron nitride;

b) heating and compressing the blended mixture in a mold under an inert atmosphere at a temperature between about 1675° C. and about 1770° C. at a pressure between about 1800 and 2700 pounds per square inch for a time period until the composite stops shrinking; and c) cooling the composite.

As used herein an inert atmosphere is a vacuum or an atmosphere composed of an inert gas such as argon, nitrogen or the like.

In some applications it may be preferable to have the purity of the boron nitride not less than 99 weight percent, and more preferably not less than 99.5 weight percent boron nitride. The purity refers mainly to the absence of impurities which form liquids or react to form liquids at the processing temperature. For example, the impurity of boron oxide in boron nitride after hot pressing can form a glassy grain boundary phase during processing which could result in the ceramic composite being severely eroded/corroded in molten alloys. Non-liquid forming impurities may be present in larger amounts without effecting the overall characteristics of the ceramic composite.

In other applications 97 weight percent boron nitride material could be used to produce good ceramic composites of this invention. Thus the oxygen content of boron nitride in the starting material could be up to 3 percent by weight or more. The temperature of the process depends on the oxygen content in the boron nitride so that a higher temperature of about 1730° C.±40° C., preferably about 1750° C., would be used for boron nitride containing oxygen equal to or in excess of 2% by weight while a temperature of 1675° C. to 1730° C., preferably about 1725° C., could be used for boron nitride containing less than 2% by weight oxygen.

Preferably the particulate mullite should be sized between about 0.1 and 75 microns and preferably between about 2 and about 45 microns. The particulate yttria stabilized zirconia should be sized between about 0.1 and 45 microns and preferably between about 1 and about 25 microns. The particulate boron nitride should be sized between about 0.1 and 45 microns and preferably between about 1 and about 25 microns. The particulate components should be blended to form a substantially homogeneous mixture in a conventional type blender or mixer such as double cone blenders, twin shell or V-blenders, drum blenders, and the like.

The blended mixture s then heated at a temperature between about 1675° C. and 1730° C., preferably between about 1710° C. and 1725° C. at a pressure between about 1800 and 2700 psi, preferably between about 2100 at 2300 psi. Preferably the heating step should be at a rate of 200° C. to 400° C. per hour, more preferably 300° C. to 350° C. per hour and the pressure at a rate of 300 psi to 600 psi per hour and most preferably 400 psi to 500 psi per hour.

The temperature and pressure selected should be sufficient to form the ceramic composite but below the temperature that the mixture would melt or react with the mold material, such as a graphite mold. The time period for the hot pressing step should be continued until the ceramic composites effectively or substantially stops shrinking.

Hot isostatic compression could be used in which there is no one direction of compression, and the composite produced will be isotropic. The compression and heating step should be performed in a non-oxidizing atmosphere with respect to the blended mixture. A suitable non-oxidizing atmosphere may be provided by a vacuum, or an atmosphere of a non-oxidizing gas such as an inert gas such as argon, nitrogen, or the like. In an oxidizing atmosphere, such as air, the boron nitride could oxidize to form a $B_2O_3$ phase, which is in a liquid phase during heating. This impurity could result in an inferior composite with respect to erosion/corrosion in molten alloys.

After the ceramic composite has effectively stopped shrinking, the composite is cooled and machined to appropriate sizes and shapes for its particular application.

Whether conventional hot-uniaxial pressing techniques or isotatic hot-pressing techniques are employed, the composite produced can be machined in any direction. Preferably, for break ring applications, the break ring should be machined so that the thickness or width of the break ring is parallel to the direction of the applied pressure during the hot-pressing step. Thus the direction of the applied pressure should be parallel to a plane perpendicular to the longitudlnal axis of the ring.

The ceramic composite of this invention is ideally suited for use as break rings in horizontal continuous casting processes, crucibles, on atomization nozzles, dies and welding nozzles.

The following examples are intended to illustrate the invention, and are not intended to limit the scope of the present invention in any manner.

The fused zirconia mullite which was used to provide an example of the prior art, was obtained from Keith Refractories of Great Britain under the trade name K-Ref Fused Zirconia Mullite 36. The fused zirconia mullite had a particle size of 200 Tyler mesh (−75 microns) and was composed of about 62.8 weight percent mullite, about 36.9 weight percent zirconia with a minor amount of $H_fO_2$, and remained minor amounts of various oxides and free iron.

The mullite for use in the examples of this invention was obtained from Keith Refractories of Great Britain under the trade name White Fused Mullite. The mullite had a particle size of 200 Tyler mesh (−75 microns) and was composed of about 76 weight percent $Al_2O_3$ and about 23.6 weight percent $SiO_2$, with a minor amount of $Na_2O/K_2O$, $Fe_2O_3$, CaO, free iron, TiO and MgO.

The yttria stabilized zirconia used in the examples was obtained from Muscle Shoals Minerals Company under the brand name ZY-7 Fines. The yttria stabilized zirconia has a particle size of 325 Tyler mesh (−45 microns) and was composed of 88 weight percent $ZrO_2$ and 10.9 weight percent $Y_2O_3$, with a minor amount of MgO, $TiO_2$, $SiO_2$, $Al_2O_3$, $Fe_2O_3$ and CaO.

The boron nitride used in all the examples was obtained from Union Carbide Corporation, a New York Corporation under the trade name UCC Grade HCP Boron Nitride. This boron nitride was temperature purified to 1900° C. to reduce any $B_2O_3$ to less than 0.5 weight percent and with less than 0.5 weight percent lattice oxygen (measured as $O_2$). The boron nitride had a surface area of 10 to 15m²/gm and a particle size in which 94.5% passed through a 325 Tyler mesh (−45 microns). Also Union Carbide Corporation's trade name UCC Grade BN-5 was used in which the $B_2O_3$ was as high as 3 weight percent and with up to 3.0 weight percent lattice oxygen (measured as $O_2$).

EXAMPLE I

Various amounts of boron nitride and fused zirconia mullite were mixed for about two hours in a twin shell V-blender with an intensifier bar. The blended materials were then prepressed into a fine-grain graphite cylindrical mold having a 2 inch inner diameter, a 3.75 inch outer diameter and 18 inches in length. The mold was lined with a layer of Grafoil (Trade Mark of Union Carbide Corporation for flexible graphite) as a precaution to keep the composite from sticking to the mold when processed. In most applications the liner would not be necessary.

Each mold and contents were loaded into a resistance heated tube furnace, and heated for two hours at 1700° C. under a pressure of 2200 psi provided by a hydraulic ram in a nitrogen atmosphere. The heating and pressurizing rates were 330° C./hr and 500 psi/hr, respectively. Each mold was allowed to cool and then a two and a half inch billet was removed from each mold.

Figure 1:
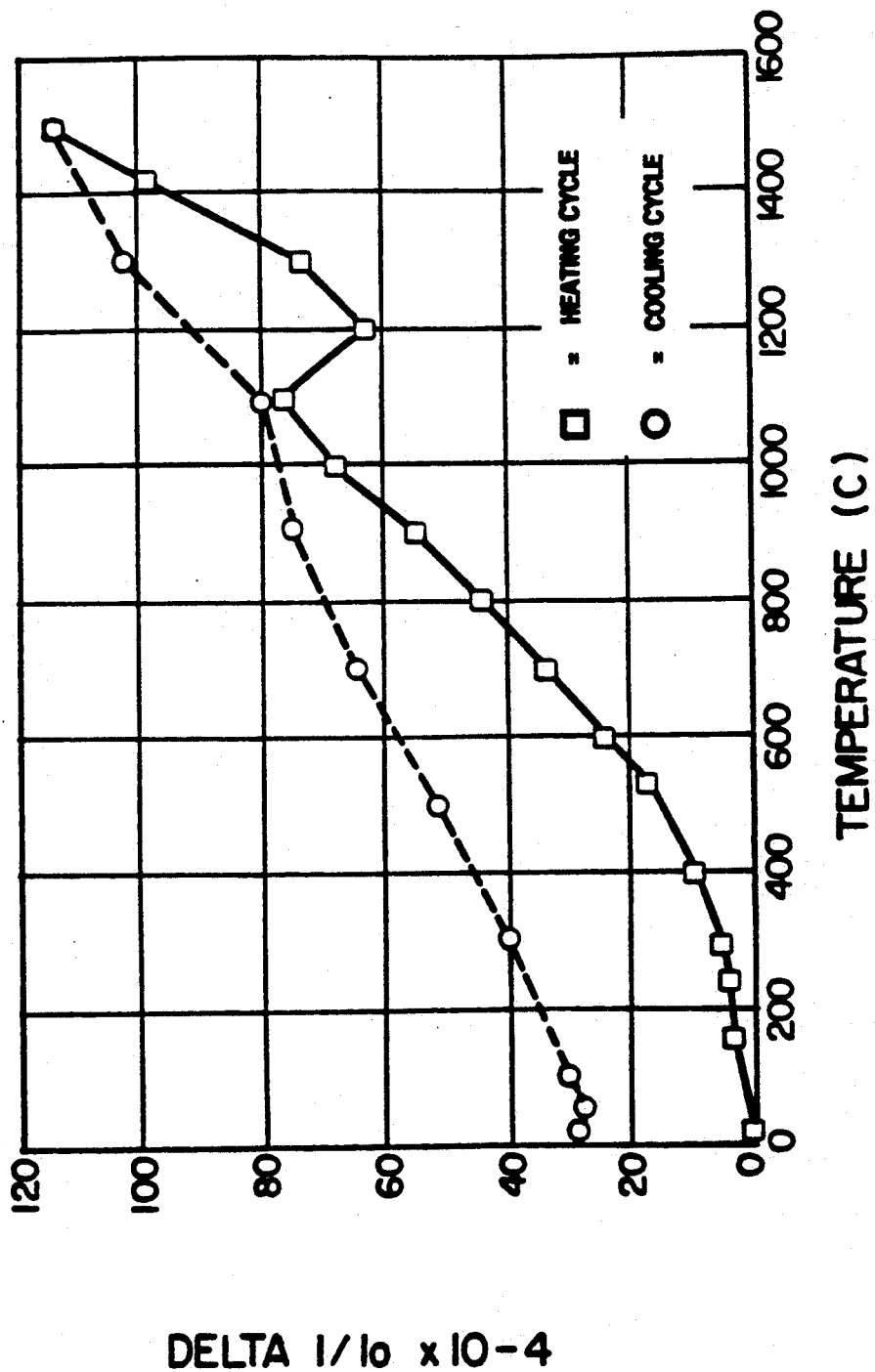
FIG. 1 is a plot of temperatures versus the change in length over the original length of a prior art sample of zirconia mullite/boron nitride.

The coefficient of thermal (CTE) expansion for the prior art billet was examined by heating a sample billet at a rate of 400° C. per hour up to 1500° C. and then cooling the billet down to 20° C. The data obtained is shown in FIG. 1 which is a plot of temperature versus delta $L/LO \times 10^{-4}$ where delta $L/LO$ is the change Pn length over the original length.

This plot shows that the sample of the billet expands up to 1100° C. and then went through a shrinkage step before expanding again. This phenomenon could lead to cracking of an article, such as a break ring, fabricated from this ceramic material since stresses would be imparted to the article during heating to high temperatures. In addition, upon being cooled the length of the sample permanently increased so that the new length had a 0.335 percent permanent expansion.

Figure 2:
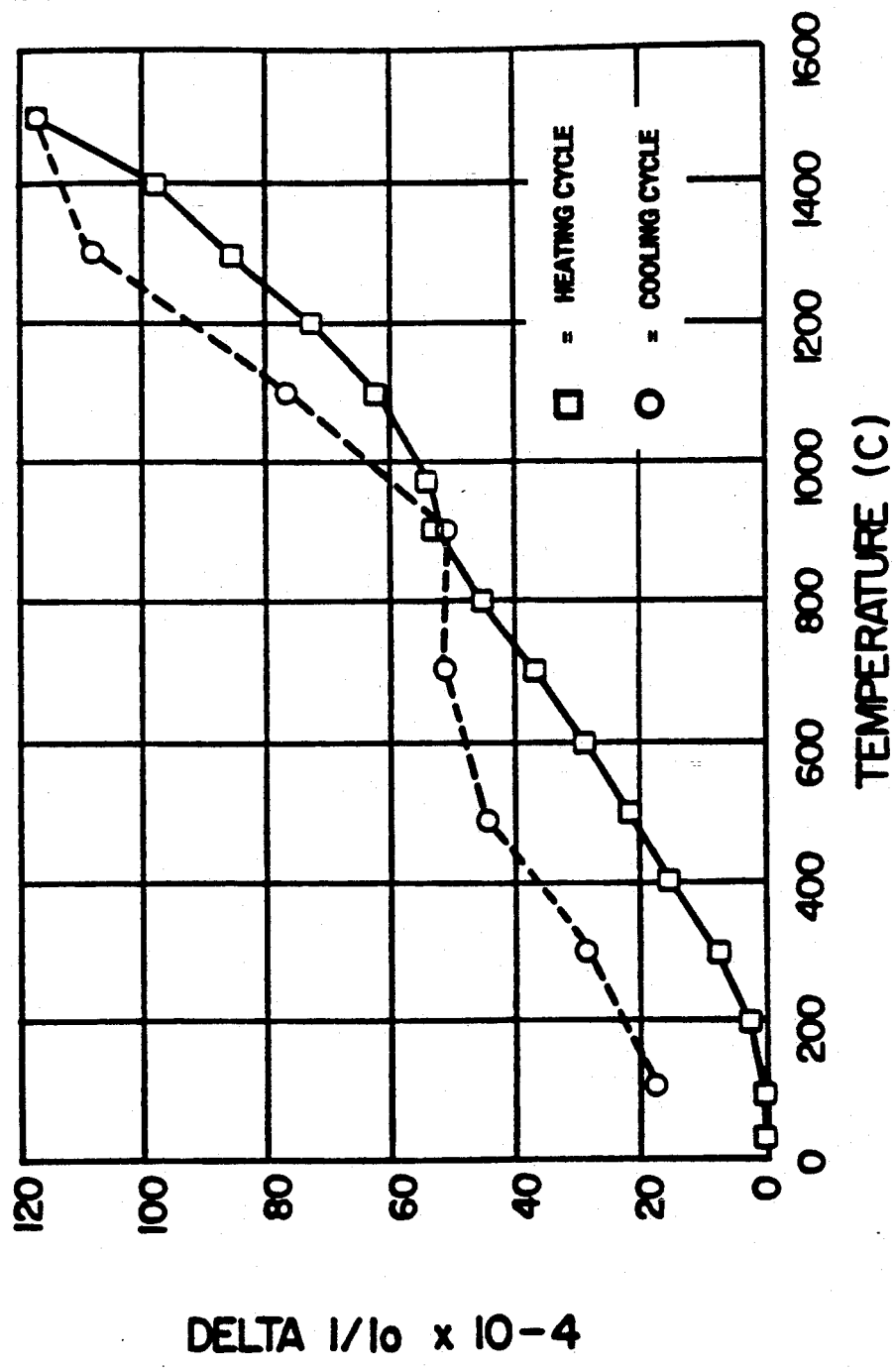
FIG. 2 is a plot of temperature versus the change in length over the original length of a mullite/yttria stabilized/boron nitride sample of this invention.

A similar type two and a half inch billet was produced except that the starting composition was 200 grams of boron nitride and 200 grams of mullite. The rate of heating procedure was the same up to a temperature of 1725° C under a pressure of 2200 psi. The CTE for a sample of this billet was tested as described above. The data obtained from the heating test is shown in FIG. 2 which is a plot of temperature versus delta $L/LO \times 10^{-4}$. This plot shows that the sample of the billet of this invention expanded substantially linearly up to 1500° C. and when cooled to 20° C. returned to its effective length with only a 0.064 percent permanent expansion.

The comparison data obtained from this example clearly shows that the composition of this invention can be used in high temperature environments without cracking due to shrinkage or the like.

EXAMPLE II

Various amounts of boron nitride, yttria stabilized zirconia and mullite were mixed for about two hours in a twin shell V-blender with an intensifier bar. The blended materials were then prepressed into fine-grain graphite molds each having an inside diameter of 2.0 inches (5 cm), an outside diameter of 3.75 inches (9.5 cm) and a length of 18 inches (45.7 cm). Each mold was lined with a layer of Grafoil (Trade Mark of Union Carbide Corporation for flexible graphite) to keep the composite from sticking to the mold when processed.

The molds and contents were loaded into a 4 inch (10 cm) diameter resistance heated tube furnace, and heated for two hours at various temperatures under a pressure of 2200 psi provided by a hydraulic ram in a nitrogen atmosphere. The heating and pressurizing rates were 330° C./hr and 500 psi/hr, respectively. The molds were allowed to cool and then a two-inch diameter billet was removed from each mold. The amounts of the blend, proportions of the blend, and temperature of the heating step for each sample billet produced are shown in Table 1.

Sample bars were cut from each billet parallel to the pressing direction and then the percent theoretical density was obtained for each sample. The data obtained are shown in Table 1. A sample bar from each billet measuring 0.75 inch (1.9 cm) diameter by 3 inches (7.6 cm) long was rotated at 60 revolutions per minute (rpm) in molten 304 stainless steel at a temperature of 1575° C. for four hours. The reduction in the diameter of each sample was then measured as a percent reduction per hour and the data obtained are shown in Table 1. The reduction in the diameter of the sample is an indication to the erosion/corrosion resistance characteristics of the sample.

A sample bar from each billet was subject to a thermal shock test which consisted of dunking a room-temperature sample bar measuring 0.75 inch (1.9 cm) diameter by 3 inches (7.6 cm) long into a 1575° C. stainless steel melt and then air quenching. The visual results observed are shown in Table 1.

As can be seen in Table 1, the composite of this invention possesses good thermal shock resistance and good erosion/corrosion resistance.

TABLE 1

| Sample No. | Mullite Content (w/o) | Yttria Stabilized Zirconia | BN Content (w/o) | Hot-Pressing Temperature (°C.) | Density (g/cm³) | Percent Theoretical Density | Thermal Shock Test | Compatibility (% Reduction in Diameter per Hour) |
|---|---|---|---|---|---|---|---|---|
| 1 | 31.55 | 18.45 | 50.0 | 1725 | 2.467 | 88.6 | OK | 7.14 |
| 2 | 25.20 | 14.80 | 60.0 | 1725 | 2.229 | 83.8 | OK | 5.91 |
| 3 | 18.90 | 11.10 | 70.0 | 1725 | 1.900 | 74.7 | OK | 8.47 |

EXAMPLE III

Sample 6-inch diameter billets were produced from material as made in Sample No. 1 of Table 1. The billets were examined and their properties measured. Specifically, the density room-temperature flexural strength, 1500° C. flexural strength, coefficient of thermal expansion (CTE), Rockwell R hardness and sonic modulus were measured for each of the sample bars.

The flexural strengths, at 1500° C., and at room temperature, were determined using the ASTM D-690 three point loading method.

The sonic modulus for each sample bar was determined using the sonic resonance technique as disclosed in ASTM C747-74.

The CTE was measured by placing the sample bar on support pins and inserting lengthwise into a graphite tube furnace. An optical extensometer was used which comprised two parallel telescopic sights mounted so that the distance between the axis of the sights could be adjusted. A caliper was used to measure the distance between the sights. The sights were focused on the ends of the sample bar through the sight tubes in the furnace. The furnace was heated under an inert atmosphere, and at appropriate temperature intervals the length of the sample was measured with the caliper. The CTE was calculated as the fractional change of the length of the sample divided by the rise in temperature in degrees centigrade.

The data obtained from these tests are shown in Table 2.

TABLE 2

| | | MULLITE/BORON NITRIDE | | | | |
|---|---|---|---|---|---|---|
| Sample No. | Density (g/cm$^3$) | Sonic Modulus × 10$^6$ (psi) | Room Temp. Flexural Strength (psi) | 1500° C. Flexural Strength (psi) | Rockwell Hardness (R-Scale) | 1500° C. CTE × 10$^{-6}$ (in/in/°C.) | Percent Permanent Expansion |
| 4[1] | 2.569 | 2.540 | 7,542 | 2,718 | 118.4 | 7.82 | 0.06 |
| 5[2] | 2.569 | 10.38 | 18,169 | 7,317 | 118.4 | 3.23 | 0.16 |

[1] sample cut parallel to the pressing direction.
[2] sample cut perpendicular to the pressing direction.

As evidenced from the data shown in Tables 1 and 2, ceramic composites made in accordance with this invention exhibit high abrasion resistance, high thermal shock resistance, good high temperature strength and will provide longer service life in heated environments. For break ring applications, the thickness of the rings should be machined so that the thickness or width of the ring is parallel to the direction that the pressure was applied during the hot pressing fabrication step.

While this invention has been described with reference to certain specific embodiments and examples, it will be recognized by those skilled in the art that many variations are possible without departing from the scope and spirit of the invention, and that the invention, as described by the claims, is intended to cover all changes and modifications of the invention which do not depart from the spirit of the invention.

What is claimed:

1. A ceramic composite comprising a mixture of boron nitride, yttria stabilized zirconia and mullite, said ceramic composite comprising from 10 to 60 weight percent mullite, from 10 to 30 weight percent yttria stabilized zirconia and from 30 to 70 weight percent boron nitride based on the weight of the ceramic composite.

2. The ceramic composite of claim 1 wherein said ceramic composite comprises from 20 to 40 weight percent mullite, from 15 to 25 weight percent yttria stabilized zirconia and from 40 to 60 weight percent boron nitride.

3. The ceramic composite of claim 2 wherein said ceramic composite comprises about 32 weight percent mullite, 18 weight percent yttria stabilized zirconia and about 50 weight percent boron nitride.

4. A break ring of ceramic composite for use in horizontal continuous casting processes comprising a mixture of boron nitride, yttria stabilized zirconia, and mullite, said ceramic composite comprising from 10 to 60 weight percent mullite, from 10 to 30 weight percent yttria stabilized zirconia, and from 30 to 70 weight percent boron nitride based on the weight of said break ring.

5. The break ring of claim 4 wherein said mullite comprises from 20 to 40 weight percent mullite, from 5 to 25 weight percent yttria stabilized zirconia and from 40 to 60 weight percent boron nitride.

6. The break ring of claim 5 wherein said break ring comprises about 32 weight percent mullite, about 18 weight percent yttria stabilized zirconia and about 50 weight percent boron nitride.

* * * * *